Feb. 7, 1961   R. W. FISK   2,970,682
RECIPROCATING GRAVITY CONVEYER
Filed Nov. 13, 1957
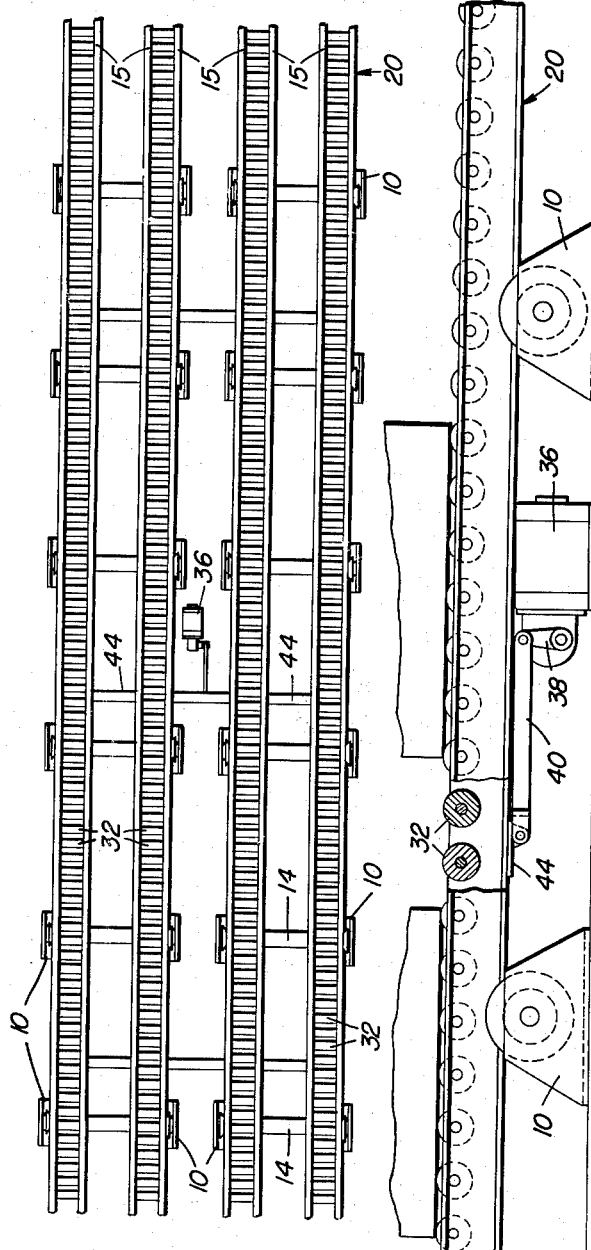
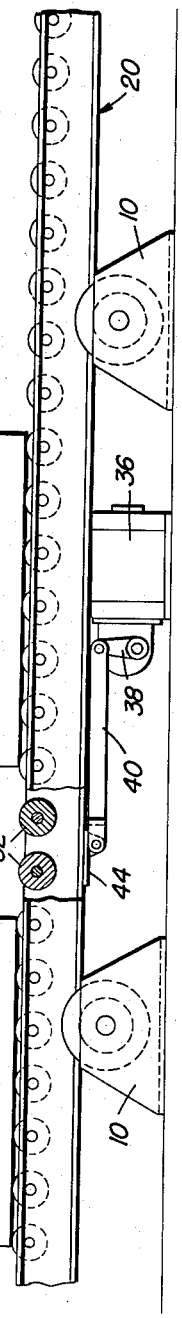
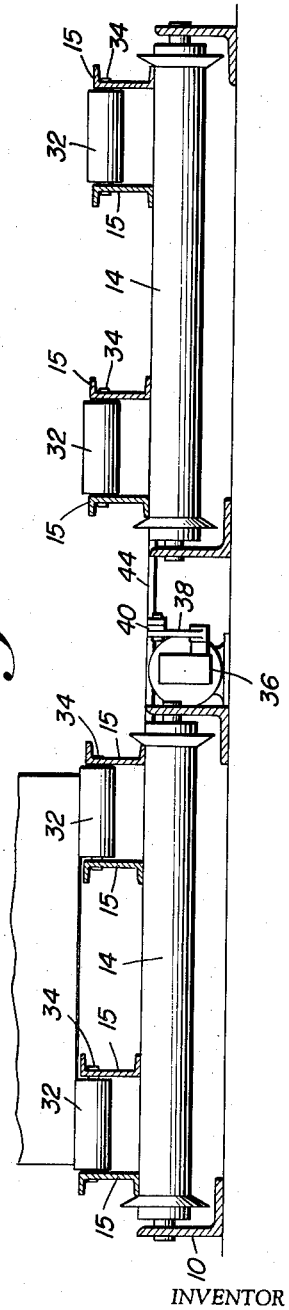
INVENTOR
Robert W. Fisk
BY *Mead, Browne, Schuyler & Beveridge*
ATTORNEY ID # United States Patent Office 2,970,682
Patented Feb. 7, 1961

2,970,682

RECIPROCATING GRAVITY CONVEYER

Robert W. Fisk, Sunnyvale, Calif., assignor to Mathews Conveyer Company, Ellwood City, Pa., a corporation of Pennsylvania Filed Nov. 13, 1957, Ser. No. 696,219

3 Claims. (Cl. 193—35)

This invention relates to controlled gravity conveyers and it particularly concerns a reciprocating gravity conveyer having rotary elements for conveying objects along an inclined path by gravity.

Inclined conveyers having rotatable elements forming a conveyer surface along which articles are moved by gravity present problems of control of the speed of the articles. In the case of irregular objects and objects having soft surfaces such as bags and sacks, it is difficult to maintain continued movement of the articles unless the inclined surface of the conveyer is given a sufficient grade to insure that the gravitational force will always exceed forces resisting movement of the articles over the conveyer surface.

In the case of packaged articles having relatively low surface friction and low resistance to forward motion over the conveyer surface, where movement is stopped in the accumulation of a line of articles on the conveyer, resumption of travel may be accomplished only if the conveyer is inclined to a point where the normal speed will be excessive and likely result in damage when one article collides with another.

It is therefore a major object of this invention to control movement of articles along a gravity conveyer having a conveyer surface formed by rotatable elements to insure movement of the articles at a safe speed and also insure starting of the articles in the event they are stopped during their movement along the conveyer surface.

More particularly, it is an object of this invention to control the speed of the articles by reducing the grade of the inclined gravity conveyer and insure continued movement of articles by manipulation of the conveyer.

A further object of this invention is to move articles at a safe rate of speed and insure resumption of movement whenever the articles on the conveyer are stopped for purposes of accumulation or for other purposes.

A more specific object of the invention is to operate an inclined gravity conveyer having rotatable load supporting elements forming a conveyer surface in a manner to insure continued movement of articles even though the grade of the conveyer is set at an angle below that at which the articles would normally move freely.

In the achievement of the foregoing, and other objects, a conveyer assembly embodying the invention includes a movable frame having a plurality of conventional conveying rollers. The movable frame is supported upon a stationary frame with the conveying surface defined by the rollers inclined downwardly at a relatively small angle toward the discharge end of the conveyer. The angle of inclination is such that the gravitational forces acting on an article supported upon the conveying surface are substantially balanced by the starting friction and inertia of the roller which acts to resist movement of the article along the conveyer. An article in motion upon the conveying surface will remain in motion because the sum of gravitational and inertial force exceeds the frictional resistance. An article at rest upon the conveying surface will remain stationary because the sum of the inertial force and the frictional force is greater than the gravitational force.

The roller conveyer frame is mounted upon the stationary frame so that it may be reciprocated in a direction parallel to the longitudinal extent of the roller conveyer, and suitable apparatus for applying the reciprocatory force is coupled between the stationary frame and the movable frame. Reciprocation of the conveyer eliminates friction as a factor in the movement of articles, so stationary articles are moved by the gravitational force overcoming the inertial force, and moving objects are substantially uneffected.

Other objects, advantages and features of the invention will become apparent from the following description taken in conjunction with accompanying drawings wherein:

Fig. 1 is a plan view of a controlled gravity conveyer embodying the invention in its preferred form;

Fig. 2 is a side view of the controlled gravity conveyer shown in Fig. 1 with some parts broken away and others shown in section for purposes of clearness; and Fig. 3 is a cross-sectional view of the controlled gravity conveyer shown in Fig. 1.

To support the conveyer for reciprocation, a plurality of brackets 10 support rollers 14 at spaced intervals longitudinally of the conveyer. In the embodiment shown in the drawings, the rollers 14 are arranged in pairs, side by side, to support parallel conveyer lines. Resting upon rollers 14 are pairs of parallel channels 15, 15 secured in spaced relation to form conveyer frame designated generally at 20. These conveyer frames are inclined to the horizontal. Mounted between channels 15, 15 of the conveyer frames are a plurality of rotatable elements in the form of rollers 32, 32 rotatably mounted on shafts 34, 34 extending between the channels 15, 15 to form a conventional roller conveyer. Rollers 32, 32 in the conveyer frames 20 form a conveying surface which is inclined to the horizontal and along which articles may be moved by gravity.

For purposes of initiating movement of articles whose resistance to movement exceeds the force of gravity due to the low angle in inclination of the conveyer frames, or to maintain movement of articles where the force of gravity is insufficient to overcome the normal resistance to movement downwardly along the conveyer surface, conveyer frames 20 are reciprocated back and forth in a direction normal to the axis of rotation of the rollers 32 as defined by shafts 34. Preferably this reciprocation is accomplished approximately in the plane of the conveyer surface by a motor 36 which drives through a crank 38 and connecting link 40 to a bracket 44 secured to the conveyer frames. Motor 36 may be driven continuously to insure continued movement of articles along the conveyer surface or may be operated intermittently where the only purpose of the reciprocation is to overcome resistance of articles to initial movement, where the inclination of the conveyer is sufficient to insure continued movement of the articles once they are started.

Articles move downwardly along the conveyer when the force due to the acceleration and the de-acceleration of the conveyer is greater than the restraining friction of the bearing and roll contact less the forward component of the mass. This compares to a normal fixed gravity conveyer requiring the forward component of mass as determined by the grade to be greater than the bearing and roll contact friction. As a result, masses with hard supporting surfaces and small roll contact friction as well as masses such as bags, sacks or irregular objects with soft supporting surfaces or hard obstructions and high roll contact friction can be caused to move at a safe rate of speed and can be accumulated against a stop or flow metering device with a minimum of line pressure.

The speed of motion is determined by the setting of a reciprocating rate and distance of travel of the conveyer section as well as the conveyer grade. These factors are balanced against the resistance to forward motion of the mass on the conveyer. This is applicable to lines set at low grades to prevent free rolling once they are started but always, or occasionally, require assistance in restarting once they have come to rest. In addition, the cycling may be continuous, or occasional, under manual or automatic control. The gravity conveyers attached to a drive may be on line only, or on any combination of multiple lanes and levels.

While the drawings show reciprocating motion effected by a motor and crank, it obviously may be accomplished by air cylinders, or any other device to apply a force to the conveyer frame in a direction normal to the axes of rollers 32.

The foregoing description is one embodiment of the invention and it will be apparent to those skilled in the art that various changes and modifications may be made therein without departing from the scope of the invention.

What I claim as my invention is:

1. A conveyer assembly comprising an elongate conveyer frame having a plurality of load supporting elements mounted therein for free rotation about axes extending transversely of said frame, said load supporting elements defining an article conveying surface inclined longitudinally toward one end of said frame to gravitationally urge articles on said conveying surface toward said one end of said frame, and means for driving said frame in longitudinal reciprocation to facilitate the movement of articles along said conveying surface under the influence of gravity.

2. A conveyer assembly comprising an elongate conveyer frame, a plurality of load supporting roller elements mounted on said conveyer frame for free rotation about parallel horizontal axes extending transversely of said conveyer frame and defining an article conveying surface on said frame, means supporting said conveyer frame for movement along a path extending longitudinally of said frame with said conveying surface inclined longitudinally toward one end of said conveyer frame to gravitationally urge articles supported on said conveying surface toward said one end of said frame, and means for driving said conveyer frame in longitudinal reciprocation along said path to facilitate the movement of articles along said conveying surface under the influence of gravity.

3. A conveyer assembly comprising a fixed frame, an elongate conveyer frame supported upon said fixed frame for movement along a path extending longitudinally of said conveyer frame, a plurality of load supporting roller elements mounted in said conveyer frame for free rotation about axes extending transversely of said conveyer frame, said load supporting elements defining a conveying surface inclined longitudinally toward one end of said conveyer frame to gravitationally urge articles on said conveying surface toward said one end of said conveyer frame, and means coupled between said fixed frame and said conveyer frame for driving said conveyer frame in longitudinal reciprocation along said path to facilitate the movement of articles along said conveying surface under the influence of gravity.

References Cited in the file of this patent
UNITED STATES PATENTS

| | | |
|---|---|---|
| 1,699,955 | Cope | Jan. 22, 1929 |
| 2,493,465 | Persson | Jan 3, 1950 |
| 2,820,542 | Oswald | Jan. 21, 1958 |